(12) United States Patent
Giebelhausen et al.

(10) Patent No.: US 6,551,700 B2
(45) Date of Patent: Apr. 22, 2003

(54) SPHERICAL HIGH-PERFORMANCE ADSORBENTS WITH MICROSTRUCTURE

(75) Inventors: Jann-Michael Giebelhausen, Rathenow (DE); Hubertus Spieker, Paderborn (DE)

(73) Assignee: Carbotex (DE)

(*) Notice: Subject to any disclaimer, the term of this patent is extended or adjusted under 35 U.S.C. 154(b) by 7 days.

(21) Appl. No.: 09/801,280

(22) Filed: Mar. 8, 2001

(65) Prior Publication Data
US 2002/0028333 A1 Mar. 7, 2002

(30) Foreign Application Priority Data
Mar. 8, 2000 (DE) .......................................... 100 11 223

(51) Int. Cl.$^7$ ................................................ B32B 5/16
(52) U.S. Cl. ................................ 428/315.5; 428/315.7; 428/402; 502/402
(58) Field of Search .................... 502/402; 428/402, 428/304.4, 308.4, 315.5–315.7

(56) References Cited

U.S. PATENT DOCUMENTS

| | | | | |
|---|---|---|---|---|
| 4,040,990 A | * | 8/1977 | Neely | |
| 4,263,407 A | * | 4/1981 | Reed | |
| 5,370,794 A | * | 12/1994 | Obayashi et al. | |
| 5,419,956 A | * | 5/1995 | Roe | |
| 5,460,725 A | * | 10/1995 | Stringfield | |
| 5,506,035 A | * | 4/1996 | Van Phan et al. | 428/196 |
| 5,549,590 A | * | 8/1996 | Suskind et al. | |
| 5,614,460 A | * | 3/1997 | Schwarz et al. | |
| 5,679,432 A | * | 10/1997 | Holmquest et al. | 428/71 |
| 6,074,983 A | * | 6/2000 | Derolf et al. | 502/407 |
| 6,376,404 B1 | * | 4/2002 | Giebelhausen et al. | 502/10 |

FOREIGN PATENT DOCUMENTS

| | | |
|---|---|---|
| DE | 37 12 486 A1 | 10/1988 |
| DE | 41 26 960 A1 | 2/1993 |
| DE | 43 34 808 C1 | 10/1994 |
| WO | 2164261 | 7/1972 |
| WO | 125340 | 2/1976 |

* cited by examiner

Primary Examiner—H. Thi Le
(74) Attorney, Agent, or Firm—Keusey, Tutunjian & Bitetto, P.C.

(57) ABSTRACT

Spherical high-performance adsorbents, which are manufactured from polymer resin by water vapour activation with an activation time of at least 6 hours. The adsorbents have a pronounced microstructure in the range of 0 to 40 Å pore diameter and an overall micropore volume of at least 0.6 cm$^3$/g. A substantial increase in the adsorption capacity for gases and vapours is achieved which is also represented by the very favourable ratio of weight capacity to volume capacity of upto 2 to 1. The spherical high-performance adsorbents with microstructure can be used for many purposes, in particular, textile fabrics for the adsorption of chemical warfare agents and toxic gases and vapours, in adsorption refrigerating plants in combination with the refrigerating agent methanol, in motor vehicle filters and biofilters.

13 Claims, No Drawings

SPHERICAL HIGH-PERFORMANCE ADSORBENTS WITH MICROSTRUCTURE

BACKGROUND OF THE INVENTION

1. Field of the Invention

The invention relates to spherical high-performance adsorbents with microstructure particularly adapted for the adsorption of gases and vapours in defined structural units, in particular in textile fabrics for the adsorption of chemical warfare agents and toxic gases and vapours, in support structures of adsorption refrigerating plants in the field of air conditioning engineering, in filter units for the adsorption of noxious gases and vapours in motor vehicles and in biofilters.

2. The Prior Art

It is known that spherical products which are produced in accordance with various methods from preformed starting materials or from carbonaceous materials and a binding agent can be used for the adsorption of particular gases and vapours.

The use of adsorbent ion exchanger resins for the removal of gaseous sulphur dioxide is described in German Laid Open document 2164261. In accordance with this method macroporous anion exchanger resins are used, however, the adsorption capacity is far below that of activated carbon. The adsorption capacity is instead comparable with active coke. Their suitability is limited to the adsorption of sulphur dioxide, without achieving the degree of separation of conventional activated carbon.

Partially pyrolysed particles of resin-type polymers for the removal of impurities from gases and liquids are known from East German Patent Specification 125340. The described particles are macroporous, with macropores in the range from 50 Å to 100,000 Å as the mean critical dimension. The atomic ratio of carbon to hydrogen is 1.5:1 to 20:1. By virtue of the missing activation stage, this product does not have an adequate adsorption performance and has an unfavourable pore distribution. As a result, this process only produces adsorbents of medium quality.

The spherical activated carbon which is described in DE 19538373 is manufactured on a base of a carbonaceous starting material and a binding agent. In the patent specification the suitability of the spherical activated carbon for the adsorption of hydrocarbons in motor vehicles exhaust is emphasized. The disadvantage of this product lies in the non-uniform spherical shape and the inadequate abrasion resistance. Moreover, no defined sphere diameters in the range of 0.3 to 0.7 mm are produced for technological reasons. The adsorption performance is inadequate for applications requiring high-performance adsorbents.

A formed activated carbon consisting of charcoal and betonite as a binding agent is described in DE 3712486 for the adsorption of petrol vapours in evaporation emission monitoring devices. The average grain diameter of the activated carbon is 3 mm. The disadvantage of this formed activated carbon lies in its low hardness and the associated high rate of dust formation, in the irregular shaping and the thus lower packing density and in the low bulk density in relation to the adsorption performance, which results in an unfavourable volumetric adsorption capacity.

Zeolites as adsorption agents are proposed in DE 4126960 and DE 4334808 specially for the application in adsorption refrigerating plants. However, they require a very high desorption temperature of 250° C. in combination with the refrigerating agent water. For this reason they are not very effective in the utilisation of available quantities of heat. Another disadvantage in the application of refrigerating agents having operating temperatures below 0° C., e.g. methanol, is that the adsorption performance is too low.

Micro-spheres, which consist of activated carbon particles under 0.1 mm which are bonded in water-insoluble artificial resins or of a distillation residue and a carbonaceous treatment byproduct, are known from DE 3510209 and WO 9807655. The structure of the micro-spheres consisting of several constituents results in a reduction in the available pore volume of the activated carbon constituent and thus in a lower adsorption performance. A further disadvantage is that the abrasion resistance is too low and the dust content too high.

SUMMARY OF THE INVENTION

The object of the invention is to make available spherical high-performance adsorbents for the adsorption of gases and vapours in defined structural units of textile fabrics, adsorption refrigerating plants, motor vehicle filters and biofilters. The adsorbents are to be distinguished by a very high adsorption capacity with respect to gases and organic vapours, a fine-grain fill associated with a high packing density for the achievement of a uniform layer structure to the single-layer covering, a high resistance to fracture, impact strength and abrasion resistance and extremely minimal dust constituent. The high-performance adsorbents have to be economical, without requiring large capital expenditures for equipment, employ simple technologies and also be reusable.

In this case it was discovered that spherical high-performance adsorbents, can be manufactured from polymer resins by water vapour activation with an activation time of at least 6 hours, resulting in a pronounced microstructure in the pore diameter range of 40 Å to 5 Å that they are able to absorb gases and organic vapours with a clearly higher capacity than the products of the prior art. More particularly, 5–10% of the overall micropore volume is between 20 and 40 Å; 15–25% of the overall micropore volume is between 10–20 Å; 10–20% of the overall micropore volume is between 8–10 Å; 40–50% of the overall micropore volume is between 5–8 Å; and 15–25% of the overall micropore volume is between 0–5 Å. By this enlargement of the adsorption capacity the overall efficiency of the high-performance adsorbents is improved for use in defined structural units of diverse applications. Thus with the use of the adsorbents according to the invention in textile filter units or in fixed-bed filters, the adsorption capacity per surface or volume unit can be substantially increased without expensive construction measures. Pore densities of 0.6 cm$^3$/g or higher may be obtained.

The spherical high-performance adsorbents specified by the invention have, apart from a distinctive microstructure, a uniform grain size distribution in the range of 0.315 to 0.7 mm, preferably 0.4 to 0.6 mm. More particularly, 84–95% of the particles have a grain size between 0.4–0.63 mm; 0.2–2.5% of the particles have a grain size between 0.63–0.7 mm; and 5–15% of the particles have a grain size between 0.315–0.4 mm. By this the formation of a fine-grain fill with high packing density is achieved, which even with a single-layer covering on a surface still has an effective degree of adsorption with respect to gases and vapours.

The resistance to fracture, impact strength and abrasion resistance of the high-performance adsorbents according to the invention is 100%, so that dust formation is practically non-existent. More particularly, less than 1% of particles are dust size, i.e. smaller than 0.04 mm. Consequently even in filter units subjected to strong mechanical stresses no impairment of the fill by dust or abrasion occurs.

The high-performance adsorbents according to the invention advantageously enable the application in textile fabrics for the adsorption of chemical warfare agents and poisonous gases and vapours and the inclusion of previously unused heat potentials in adsorption refrigerating plants by applying a fill to the heat exchanger faces inside the sorption unit, associated with a minimisation of the plant size. The high volumetric capacity and the very low dust content of the high-performance adsorbents according to the invention have a positive effect on the efficiency of filter units for motor vehicles and biofilter plants. Upto 2 grams absorbed substances per 100 cm$^3$ adsorbent is possible. The ratio of weight capacity to volume capacity lies between 1.8 to 1 and 1.9 to 1, but is 2 to 1 at most.

This results both in lower requirements with respect to the quantity of adsorbent as well as in the advantage of a smaller size when compared with the known filter units. The dust-free handling of the high-performance adsorbents produces further advantages with respect to processing.

DETAILED DESCRIPTION OF THE PREFERRED EMBODIMENTS

The spherical high-performance adsorbents specified by the invention are explained in further detail below by means of exemplified embodiments.

EXAMPLE 1

Initially, 3 kg of a carbonised spherical cation exchanger polymer resin, sold under the designation Lewatit 1431, from Bayer AG, Leverkusen, having the following quality specification is selected as the starting material:

| | | |
|---|---|---|
| water content | | 1.1% |
| volatile constituents | | 1.5% |
| ash content | | 2.4% |
| fixed carbon | | 96.1% |
| sulphur content | | 15.0% |
| granulation: | >1.25 mm | 0.2% |
| | 1.25 mm–1.0 mm | 5.1% |
| | 1.0 mm–0.8 mm | 36.4% |
| | 0.8 mm–0.5 mm | 56.1% |
| | <0.5 mm | 2.2% |

These gel-type resin beads are discontinuously activated for 7 hours in the inert gas flow in an indirectly heated tubular rotary kiln, with the product being circulated 8 times per kiln rotation, with the addition of 0.75 kg/hr water vapour at a low pressure on the flue gas side of 0.1 mm water column and with a product temperature of 920° C., with respect to the overall heated kiln length.

A total water vapour quantity of 0.75 kg/hr is metered into the activation kiln as follows:

| | |
|---|---|
| 0.11 kg/hr | water vapour over 17% of the kiln length |
| 0.15 kg/hr | water vapour over 43% of the kiln length |
| 0.23 kg/hr | water vapour over 54% of the kiln length |
| 0.15 kg/hr | water vapour over 65% of the kiln length |
| 0.11 kg/hr | water vapour over 83% of the kiln length |

The kiln length is measured from the bead input side.

Then the produced high-performance adsorbents are cooled and screened as grain fractions between 0.315 mm and 0.8 mm in size.

The spherical high-performance adsorbents specified by the invention have a microstructure which is characterised by the following pore distribution:

| pore diameter (in Å Angstrom) | pore volumes (in cm$^3$/g) | pore volume content of overall micropore volumes (in %) |
|---|---|---|
| 40–20 | 0.031 | 5.0 |
| 20–10 | 0.114 | 18.7 |
| 10–8 | 0.09 | 14.8 |
| 8–5 | 0.249 | 40.8 |
| 5–0 | 0.126 | 20.7 |

The measurable dust content, i.e. grains smaller than 0.04 mm is less than 1%. The remaining grain-size distribution is as follows:

| | |
|---|---|
| 0.7–0.63 mm | 0.2% |
| 0.63–0.5 mm | 12.3% |
| 0.5–0.4 mm | 78.2% |
| 0.4–0.315 mm | 9.3% |

The spherical high-performance adsorbents according to the invention are characterised by the following quality parameters specific to activated carbon:

| | |
|---|---|
| settled weight | 585 g/l |
| ash | 1.9% |
| iodine value | 1388 mg/g |
| methylene blue | 28 ml |
| BET surface | 1409 m$^2$/g |
| breaking strength | 100% |
| dynamic hardness | 100% |
| abrasion strength | 100% |
| regeneration loss (after 10 regenerating cycles) | 1.5% |

Then 500 g of the spherical high-performance adsorbents according to the invention are applied to a textile fabric, so that a high packing density is produced with a single-layer covering. The efficiency of the high-performance adsorbents used is measured in comparison with a test substance (reference substances for chemical warfare agents) characterised by the adsorption speed constant in accordance with the formula $$\lambda = 2.3 \cdot \lg c_0/c_t \cdot a^{-1}$$

a = weight of adsorbent sample
$c_t$ = concentration of the test substance after the adsorption time
$c_0$ = initial concentration of the test substance
lg = logarithm The measurement results in comparison with reference products are given in Table 1:

TABLE 1

| product | adsorption speed constant λ |
|---|---|
| PAK 500[1] | 3.2 |
| HK 44[2] | 2.3 |
| Ambersorb 572[3] | 2.1 |

TABLE 1-continued

| product | adsorption speed constant λ |
|---|---|

[1] PAK 500: sample of spherical high-performance adsorbents with microstructure
[2] HK 44: activated carbon on charcoal base
[3] Ambersorb 572: pyrolysed ion exchanger resin from Rohm & Haas, USA

EXAMPLE 2

The efficiency of the spherical high-performance adsorbents according to the invention for use in support structures of adsorption refrigerating plants is represented in Example 2.

For this 200 g of high-performance adsorbents, produced with the properties according to the invention shown in Example 1, are degassed at 150° C. for roughly 24 hours and filled into an adsorption apparatus kept at 25° C. The apparatus is evacuated up to a pressure of 5 mbar and supplied with a homogenous atmosphere of the refrigerating agent methanol. After the saturation vapour pressure is reached, the maximum charging is determined from the difference in mass between a charged and a degassed sample. The results are represented in Table 2.

TABLE 2

| Product | maximum methanol charging (in g/g) |
|---|---|
| PAK 500[1] | 0.65 |
| E 31[2] | 0.48 |
| R 1[3] | 0.33 |

[1] See Table 1
[2] E 31: spherical adsorbents with 1250 m²/g - BET surface
[3] R 1: formed activated carbon (1 mm) from Norit, Holland

EXAMPLE 3

In order to represent the use of high-performance adsorbents for the adsorption of petrol vapours in motor vehicles, the product according to the invention as specified in Example 1 is filled into a test apparatus specified by motor vehicle manufacturers and the adsorption performance is determined with respect to the model substances butane and carbon tetrachloride in comparison with commercial products.

The comparison is given in Table 3.

TABLE 3

| Parameter | PAK 500[1] | Nuchar WV-B[2] | BPL 3[3] |
|---|---|---|---|
| vibration density (g/l) | 535 | 280 | 325 |
| $CCl_4$ capacity (g/100 g) | 128.0 | 102.5 | 101.0 |
| $CCl_4$ capacity (g/100 cm³) | 68.5 | 28.7 | 32.8 |
| butane capacity (g/100 g) | 58.4 | 40.2 | 37.5 |
| butane capacity (g/100 cm³) | 31.3 | 11.3 | 12.2 |
| abrasion resistance (%) | 100 | 42 | 64 |

[1] See Example 1
[2] Nuchar WV-B: activated carbon on wood base from WESTVACO, USA
[3] BPL 3: granular activated carbon on bituminous coal base from Chemviron, Belgium The data in Table 3 show that the high-performance adsorbents specified by the invention have advantages in comparison with the standard activated carbons both in the volumetric as well as in the weight-related capacity and are eminently suitable for use in motor vehicles.

EXAMPLE 4

The suitability of the spherical high-performance adsorbents for biofilter installations is tested in a laboratory bioreactor. For this the product according to the invention as given in Example 1 is filled into the reactor chamber and immobilised with microorganisms up to a charging of 3.7× $10^9$ cells/g base material. Then 20 l/hr moist exhaust air with a toluene concentration of 500 mg/m³ are conveyed over the immobilised high-performance adsorbents. The achieved degradation capacity and the chamber charging with an efficiency of 90% are represented in Table 4.

TABLE 4

| product | degradation capacity (in g/m³ · h) | chamber charging at 90% efficiency in g/m³ · h |
|---|---|---|
| PAK 500[1] | 142.4 | 39.6 |
| WS IV[2] | 100.6 | 21.3 |
| C 40/3[3] | 74.5 | 14.5 |

[1] see example 1
[2] WS IV: formed activated carbon (4 mm) on a charcoal base from Chemviron, Belgium
[3] C 40/3: formed activated carbon (3 mm) on a bituminous coal base according to the invention, CarboTex, Germany

What we claim is:

1. High-performance adsorbents, comprising adsorber particles, which are produced from gel-type resins, comprising:
    adsorber particles having a microstructure with pores in a size range between 0 Å and 40 Å, wherein 5% to 10% of the overall micropore volume includes pores between 20–40 Å; 15% to 25% of the overall micropore volume includes pores between 10–20 Å; 10% to 20% of the overall micropore volume includes pores between 8–10 Å; 40% to 50% of the overall micropore volume includes pores between 5–8 Å; and 15% to 25% of the overall micropore volume includes pores smaller than 5 Å.

2. High-performance adsorbents according to claim 1, wherein the adsorbent particles have a substantially spherical shape.

3. High-performance adsorbents according to claim 1, wherein the pore density in the microstructure is at least 0.6 cm³/g.

4. High-performance adsorbents according to claim 1, wherein the ratio of weight capacity in grams absorbed substance per 100 g adsorbent to volume capacity in grams adsorbed substance per 100 cm³ absorbent is at most 2 to 1.

5. High-performance adsorbents according to claim 4, characterised in that the ratio of weight capacity to volume capacity lies between 1.8 and 1.9.

6. High-performance adsorbents according to claim 1, wherein the grain size of the adsorber particles lies in the range between 0.315 mm and 0.7 mm.

7. High-performance adsorbents according to claim 6, characterised in that 84.0% to 95.0% of the adsorber particles have a grain size between 0.4 mm and 0.63 mm; 0.2% to 2.5% of the adsorber particles have a grain size between 0.63 mm and 0.7 mm; and 5% to 15% of the adsorber particles have a grain size between 0.315 mm and 0.4 mm.

8. High-performance adsorbents according to claim 6, wherein the dust constituent with grain sizes of less than 0.04 mm is less than 1% of the adsorber particles.

9. High-performance adsorbents according to claim 1, comprising a textile fabric carrying said adsorber particles.

10. High-performance adsorbents according to claim 1, comprising a textile fabric carrying said adsorber particles for absorbing poisonous gases, poisonous vapors and chemical warfare agents.

11. High-performance adsorbents according to claim 1, comprising adsorption devices including said adsorber particles for refrigeration systems.

12. High-performance adsorbents according to claim 1, comprising a motor vehicle filter including said adsorber particles.

13. High-performance adsorbents according to claim 1, comprising a biofilter including said adsorber particles.

* * * * *